Figure 1:
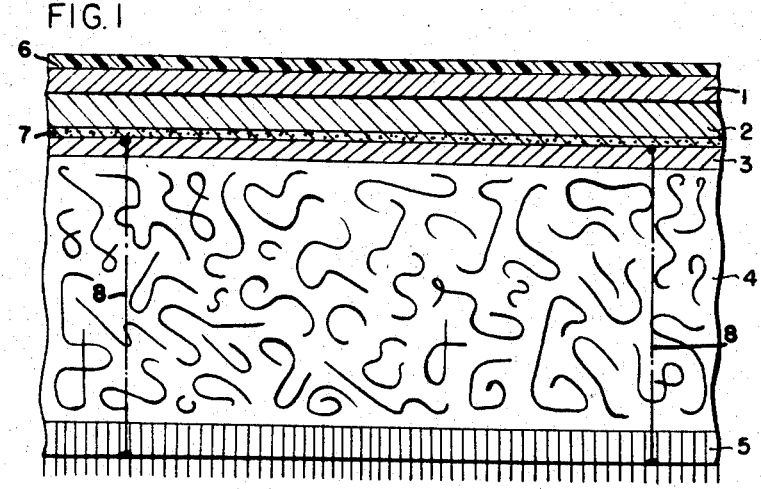

March 19, 1968  A. KRECKL  3,374,142
PROTECTIVE COVERING ARTICLE
Filed June 19, 1964

INVENTOR:
ALOIS KRECKL
BY
ATT'YS

United States Patent Office 3,374,142
Patented Mar. 19, 1968

3,374,142
PROTECTIVE COVERING ARTICLE
Alois Krecki, Kelsterbach (Main), Germany, assignor to Vereinigte Glanzstoff-Fabriken A.G., Wuppertal-Elberfeld, Germany
Filed June 19, 1964, Ser. No. 376,340
Claims priority, application Germany, June 28, 1963, V 24,241
4 Claims. (Cl. 161—50)

This invention is concerned with a multilayered protective covering article for insulation against heat and cold, and more particularly, the invention is directed to a multilayered textile product composed of synthetic fibers with a synthetic waterproofing outer or top layer in the form of a water-resistant insulating composite fabric or sheet material.

Protective insulating fabrics in the form of sheets, mats, blankets or the like have been designed for protection against heat and cold and must be constructed so as to prevent or hinder as much as possible the conduction of heat with increasing temperature difference between the body being protected and the surrounding environment. As waterproofed multilayered textile products, these insulating fabrics have wide-spread use in the production of clothing articles, sleeping bags, blankets and the like, and in addition to providing a satisfactory insulating effect, such protective articles for the purpose of at least partially enclosing the human body should be constructed in such a manner as to be hygienic and to provide clothing comfort such as light weight and flexibilty. In certain applications, it is highly important that the insulating fabric be completely waterproofed. Various known multilayered insulating fabrics meet these damands in an incomplete or unsatisfactory manner, or else certain of the desirable properties of the protective articles are generally excluded by the known construction.

For example, a synthetic insulating material for clothing articles is known in which an insulating layer of wadding or fluffy woolen cloth has been inserted between two waterproof synthetic films and stitched to these films so as to provide an insulating effect which is dependent upon the distance at which the individual layers are displaced with respect to each other. The synthetic films on either side of the insulating layer are not satisfactory for the purpose of personal hygiene, particularly due to the location of the waterproof synthetic or plastic film next to the body being protected, and these films also tend to diminish the effect of the insulating layer.

For protection against cold, covering articles have been recommended in the form of an outer fabric, lining or inner lining composed of an inner insulating layer of a relatively thin, porous, sheet structure made up of tangled fibers which are adhered or bound to each other. This insulating layer is produced by impregnating a bonding agent into a fiber fleece with the assistance of a press roll. As a result of the fiber bonding under pressure, there is a considerable decrease in the volume and fullness of the tangled fiber fleece and an optimum thermal insulating effect cannot be achieved with such a material. Furthermore, the addition of bonding agents is unsatisfactory in many clothing articles because of an undesirable stiffening of the material, and a reduction in its washability. A chemical cleaning of such articles is not usually permissible.

Other waterproof covering materials are known which consist of rubber sheets or rubberized fabrics arranged on one or both sides of the fiber fleece or textile gauze. Such materials as outer clothing articles do not have a particularly high capacity for heat retention, and various methods have been attempted for creating heat-insulating air layers between the waterproof outer covering layer and the lining. For example, an improvement in insulation has been sought by insertion of an intermediate layer of fleece or gauze material, or by impregnating a fabric layer with a binding agent and pressing or forming indentations in this layer such that air cells are formed with the adjacent textile layer. Other constructions include, for example, the combination of at least one layer of a non-elastic textile fabric with a cellular film obtained from a synthetic thermoplastic polymer which has been expanded to create enclosed gas cells. All of these known constructions are substantially lacking in the flexibility and pliability which are extremely important in the manufacture and utility of clothing articles produced from thermally insulating strips of material. In many cases, the known constructions are useful only as liners and do not have the unitary character of a single multilayered insulating fabric which can be used as the primary or substantially sole component of a protective covering article. Furthermore, previous insulated clothing articles are often excessive in weight or else do not provide the required insulating effect. Also, it is usually quite difficult to obtain a complete exclusion of water or moisture when fabricating the known insulating materials into a clothing article from several strips or sheets which have been cut to shape. Resistance to moisture is further difficult to achieve where an outer rubber or plastic film is stitched or sewn to an inner core of insulating material.

The object of the present invention is to provide a multilayered protective covering article in the form of an insulating fabric of synthetic material capable of protecting against the penetration of water as well as protecting against heat and cold and having outstanding properties which make it suitable for numerous types of clothing articles.

A specific object of the invention is to provide an insulating material which is unitary in its construction and which is capable of being easily fabricated into various clothing articles which are completely impervious to water or atmospheric moisture.

Another specific object of the invention is to provide a protective clothing article which has a high insulating effect combined with a low weight based on the area being covered. It is also an object to produce clothing articles from the insulating material of the invention so as to provide a high degree of comfort and personal hygiene as well as desirable insulating properties.

It has now been found, in accordance with the present invention, that these and other objects and advantages can be achieved by providing a multilayered, high strength, waterproof, light, protective covering article in which a voluminous fleece core composed of non-adhering polyester fibers is enclosed on either side by an inner or bottom velour fabric of polyamide threads and an outer or intermediate light weight fabric of continuous polyamide filaments, each of the fabrics being connected to the fleece by stitching, preferably such that the light weight fabric is quilt-stitched in a regular rectangular pattern through the fleece to the inner or bottom fabric. The inner velour fabric must be arranged so that its pile side faces away from the fleece in order to form the inside exterior surface of the covering article. An outer high strength fabric of polyamide threads is firmly attached over and to the light weight fabric by means of an adhesive and has its exterior surface coated by a waterproofing agent.

Figure 2:
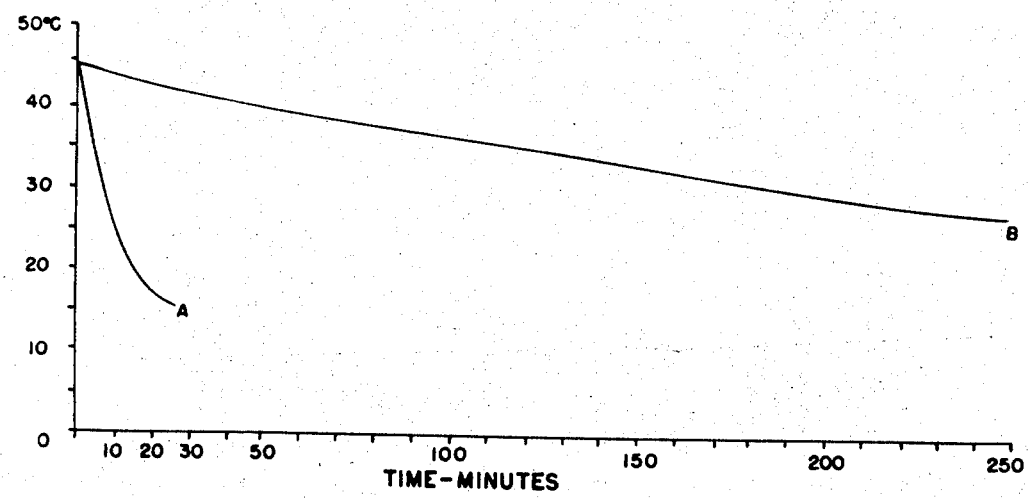

The invention is further illustrated and exemplified by the following detailed description taken in conjunction with the accompanying drawing in which:

FIG. 1 is a cross-sectional partly schematic view of the essential component layers which are joined together to form the protective covering article or insulating fabric of the invention; and FIG. 2 is a graphical illustration of the rate of heat loss from an uncovered heated body A compared with the heat loss from a heated body B, covered with the insulating material of the invention.

The protective covering article of the invention as shown in the drawing consists of two main parts: a waterproof, high strength outer or upper material composed of layers 1 and 2, and an underlying or inner insulating construction consisting of layers 3, 4 and 5 and having extremely low heat conduction properties. In a particularly advantageous embodiment of the invention, the waterproof outer material with reference to the body being protected is formed from a high-strength nylon fabric 2 consisting of polyamide threads having a denier of 210/36, and this fabric should be suitably woven so as to provide a high strength with a low weight per square meter of not more than approximately 100 grams (non-layered). This outer fabric 2 acts as a carrier sheet and is coated or impregnated with polyvinyl chloride or a synthetic rubber so as to provide a completely impervious outer exterior surface 1 which is completely waterproof and fully resistant to sea water. As a synthetic rubber for this outer surface layer, a polychloroprene such as Neoprene has been found to be particularly efficient, and it is also very advantageous to further coat this polychloroprene rubber layer with an additional layer 6 of a rubber-like, heat-curbale or vulcanizable polymer, e.g. a polymer of a cross-linkable sulfochlorinated polyethylene which can be obtained under the trademark Hypalon. When using these particular waterproofing finishing agents, it is possible to obtain a very durable outer waterproof coating which remains impervious over a long period of time during its use and storage, especially under conditions of sharply varying temperatures. Furthermore, insulating fabrics produced with these particular outer coating materials permit the bonding or heat-sealing of seams during the manufacture of clothing articles or the like, thereby providing water-tight seams in the finished article.

The insulating layers connected to the waterproof outer material include a polyester fleece core 4 in which the individual fibers have a denier of 3, and this fleece is preferably obtained by superimposing two or more carded fleeces so as to provide a weight per square meter of approximately 250 grams. Polyethylene terephthalate fibers are particularly useful and are produced in a conventional manner with crimping in order to give an expanded or voluminous fleece. The individual fibers of the fleece are not adhered to each other, but are merely loosely intertwined or tangled into a fibrous web or batt so as to maintain their volume and fullness with a corresponding complete insulating effect. This fleece 4 is covered on both sides with the nylon fabrics 3 and 5, and these two fabrics are preferably quilt-stitched in a rectangular pattern (10 x 10 cm.) to the fleece core and preferably through the fleece to each other, by means of conventional quilt-stitches 8 designated by the broken vertical lines in FIG. 1. Such stitching of the insulating layers is accomplished prior to connecting these layers with the outer waterproof layers.

The innermost fabric 5 lying beneath the fleece core 4 is a nylon velour fabric having a weight of approximately 125 grams per square meter produced from 40/18 denier threads by conventional textile methods. The pile side of this velour fabric must face to the outside, i.e. away from the fleece, in order to form the inner exterior surface of the covering article which is not only comfortable but also provides in itself excellent insulating properties. The individual filaments in this volour fabric should have a denier of not more than approximately 4, since this lower denier range gives a very voluminous volour of especially good heat-retaining capacity. Also, it is essential to use the true velour fabric rather than a pile raised by napping or other operations which tend to damage the individual filaments.

The other side of the fleece is covered by a woven monofil nylon fabric 3 having a filament denier of approximately 20. After being stitched to the fleece core, this intermediate fabric layer is firmly adhered to the adjacent waterproofed fabric 2 by means of a strong, durable adhesive 7.

The insulating and waterproof article built up in this manner from five essential layers has a total weight of about 800 grams per square meter, corresponding approximately to the normal weight of a coat or jacket material. The multilayered insulating fabric also exhibits a very high strength of approximately 100 kilograms as measured with 5 cm. strips, and it also exhibits excellent pliability and flexibility so that it can easily be formed, shaped and processed as desired into a large number of useful covering articles. The thermal insulating properties of the insulating fabric or the invention are outstanding and exceed those obtained with previous insulating materials of this type.

The term "nylon" is employed herein with reference to the well known fiber-forming polyamides which have been designated nylon-6 (polycaprolactam) and nylon-66 (polyhexamethylene adipamide). Each of the nylon fabrics 2, 3 and 5 serves a specific function in the finished article of the invention, and none of these nylon fabric layers can be omitted without losing special advantages of the invention. Similarly, additional fabric layers should be avoided since they would only increase the weight per unit area of the finished product without adding any corresponding benefit. The fleece core and the waterproof outer surface, however, can be made up as single layers as shown in the drawing or else as a plurality of layers, provided that the total weight of the covering article is kept within maximum limits depending upon the particular use of the article. The present invention is especially directed to very light weight protective covering articles or insulating fabrics which have a maximum weight of not more than about 850 g./m.$^2$ It will be recognized that there are only limited possibilities for the choice of materials which must be used in fabricating and joining the structural elements of the covering article. Thus, the polyester fleece should consist essentially of polyethylene terephthalate fibers or at least very similar light weight synthetic fibers such as those of polypropylene. If desired, a small amount of other synthetic fibers can be mixed into the fibrous fleece so as to increase the elasticity of the carded web or fibrous bat. In order to achieve the best results, the denier of the threads or filaments and the weight per unit area of the various layers should correspond closely to those values set forth hereinabove.

The diagram of FIG. 2 illustrates the time-temperature curve of an uncovered object A compared with that of a test object B which has been insulated with the preferred insulating fabric according to the invention. Each test object was first heated to the same initial temperature and then immersed in a constant temperature bath, and the temperature of the object was then measured over a period of time to determine the rate of cooling. More specifically, this experiment was carried out in the following manner: a glass flask having a volume of 100 cm.$^3$ was filled with water at a temperature of 45° C. and was then immersed in flowing water maintained at 16° C. without any covering over the glass flask. The temperature was periodically measured by means of a thermometer inserted through a rubber stopper in the flask. The temperature measurement was then repeated under the same conditions, except that the glass flask had been enclosed with the insulating fabric of the invention having the specific and essential five-component layers as described in detail above.

As will be apparent from the two curves in the graph, the non-insulated test body reaches the temperature of the cooling water after about 30 minutes, while the temperature of the insulated glass flask still remains at about 27° C. after four hours. A "half-value" time is shown for curve B of 187 minutes or approximately 3 hours.

The insulating material of the invention, because of the variety of superior properties which it possesses and the ease with which it can be cut and fabricated into different shapes, is suitable for the manufacture of a large number of protective covering articles or outer liners, and the resulting articles of manufacture can readily withstand a wide range of extreme environmental conditions. Typical useful applications including the following: special clothing for working in water, e.g. in under-water diving or in bridge building; protective wearing apparel for those engaged in ocean travel or ocean fishing, for canal workers, for sport fishing, or for airplane crews; and also protective clothing, sleeping bags or the like for expeditions in arctic regions or in mountain climbing. The insulating fabric of the invention may also be used as an insulating packaging material where it is important to combine light weight and flexibility with a high insulating capacity.

The invention is hereby claimed as follows:

1. A multilayered, high strength, waterproof, light, protective covering article capable of insulating against heat and cold which comprises: a voluminous fleece core composed of non-adhering polyethylene terephthalate fibers having a denier of approximately 3 enclosed on either side by (1) an inner nylon true velour fabric having a thread denier of approximately 40/18 such that the pile side of said velour fabric faces away from said fleece to form the inside exterior surface of said covering and (2) a light weight woven monofil nylon fabric consisting of continuous filaments of a denier of approximately 20; quilt-stitches running through said fleece core and connecting said core to each of said nylon fabrics (1) and (2); and an outer high strength nylon fabric having a thread denier of approximately 210/36 firmly attached over said light weight fabric by an adhesive and having its exterior surface coated by polychloroprene as a waterproofing agent, said protective covering article having a maximum weight of not more than about 850 g./m.²

2. A protective covering article as claimed in claim 1 wherein each of said fabrics is composed of nylon-6. superimposed layers of carded fleece batts.

3. A protective covering article as claimed in claim 1 wherein each of said fabrics is composed of nylon-6.

4. A protective covering article as claimed in claim 1 wherein the polychloroprene waterproofing layer has applied thereto an additional layer consisting of a rubber-like polymer of a cross-linkable sulfochlorinated polyethylene.

References Cited
UNITED STATES PATENTS

| | | | |
|---|---|---|---|
| 2,016,601 | 10/1935 | Hlavaty | 161—50 |
| 2,642,571 | 6/1953 | Brown | 161—62 XR |
| 2,656,586 | 10/1953 | Cowie et al. | 161—66 |
| 2,831,198 | 4/1958 | Datlof | 2—272 |
| 2,988,457 | 6/1961 | Gatcomb | 161—50 XR |
| 1,640,501 | 8/1927 | Hodes | 2—272 XR |
| 2,684,337 | 7/1954 | Frederick | 161—181 XR |
| 2,878,481 | 3/1959 | Siminow | 112—420 XR |

FOREIGN PATENTS
1,307,845  12/1961  France.

ROBERT F. BURNETT, *Primary Examiner.*

ALEXANDER WYMAN, *Examiner.*

R. H. CRISS, *Assistant Examiner.*

UNITED STATES PATENT OFFICE
CERTIFICATE OF CORRECTION

Patent No. 3,374,142                            March 19, 1968

Alois Kreckl

It is certified that error appears in the above identified patent and that said Letters Patent are hereby corrected as shown below:

Column 6, line 6, "wherein each of said fabrics is composed of nylon-6." should read -- wherein said fleece core is composed of a plurality of --.

Signed and sealed this 25th day of November 1969.

(SEAL)
Attest:

Edward M. Fletcher, Jr.                       WILLIAM E. SCHUYLER, JR.
Attesting Officer                               Commissioner of Patents